United States Patent [19]
Kuroda

[11] 3,742,105
[45] June 26, 1973

[54] METHOD FOR PRODUCING A SEAMLESS TUBING
[76] Inventor: Shigeharu Kuroda, 1994-29, Oshikuma-cho, Nara, Japan
[22] Filed: May 5, 1970
[21] Appl. No.: 34,688

[52] U.S. Cl.............. 264/89, 264/95, 264/209, 264/210 R, 264/237, 264/348
[51] Int. Cl. ... B29c 23/00, B29c 25/00, B29d 23/04
[58] Field of Search.................. 264/209, 95, 237, 264/348, 40, 89, 210 R

[56] References Cited
UNITED STATES PATENTS

| | | | |
|---|---|---|---|
| 3,311,682 | 3/1967 | Ringley et al. | 264/209 |
| 3,560,600 | 2/1971 | Gliniecki | 264/48 |
| 3,329,999 | 7/1967 | Cook | 264/95 |
| 3,284,552 | 11/1966 | Haley | 264/209 |
| 3,427,375 | 2/1969 | Turner | 264/209 |

Primary Examiner—Robert F. White
Assistant Examiner—Jeffery R. Thurlow

[57] ABSTRACT

A method for producing a seamless tubing comprises extruding the thermoplastic material from extruder in the form of tubing in semi-molten condition, introducing the first compressed cooling medium into the tubing and radially spouting the fluid medium against the inner surface of the tubing wall for a certain distance thereby expanding the tubing into desired diameter and simultaneously cooling the tubing, and centripetally spouting the second compressed cooling fluid medium against the outer surface of the tubing wall simultaneously with the spout of the first fluid medium so as to sandwich the tubing wall by the both fluid medium for a certain distance. Further, an apparatus for the method comprises an extruder for extruding the thermoplastic material in the form of tubing in semi-molten condition, means for introducing the first compressed cooling fluid medium into the tubing, means for radially spouting the fluid medium against the inner surface of the tubing wall for a certain distance to expand and cool the tubing, means for centripetally spouting the second compressed cooling fluid medium against the outer surface of the tubing wall simultaneously with the spout of the first fluid medium so as to sandwich the tubing wall by the both fluid mediums for a certain distance, and means for continuously winding up the expanded, cooled tubing.

1 Claim, 4 Drawing Figures

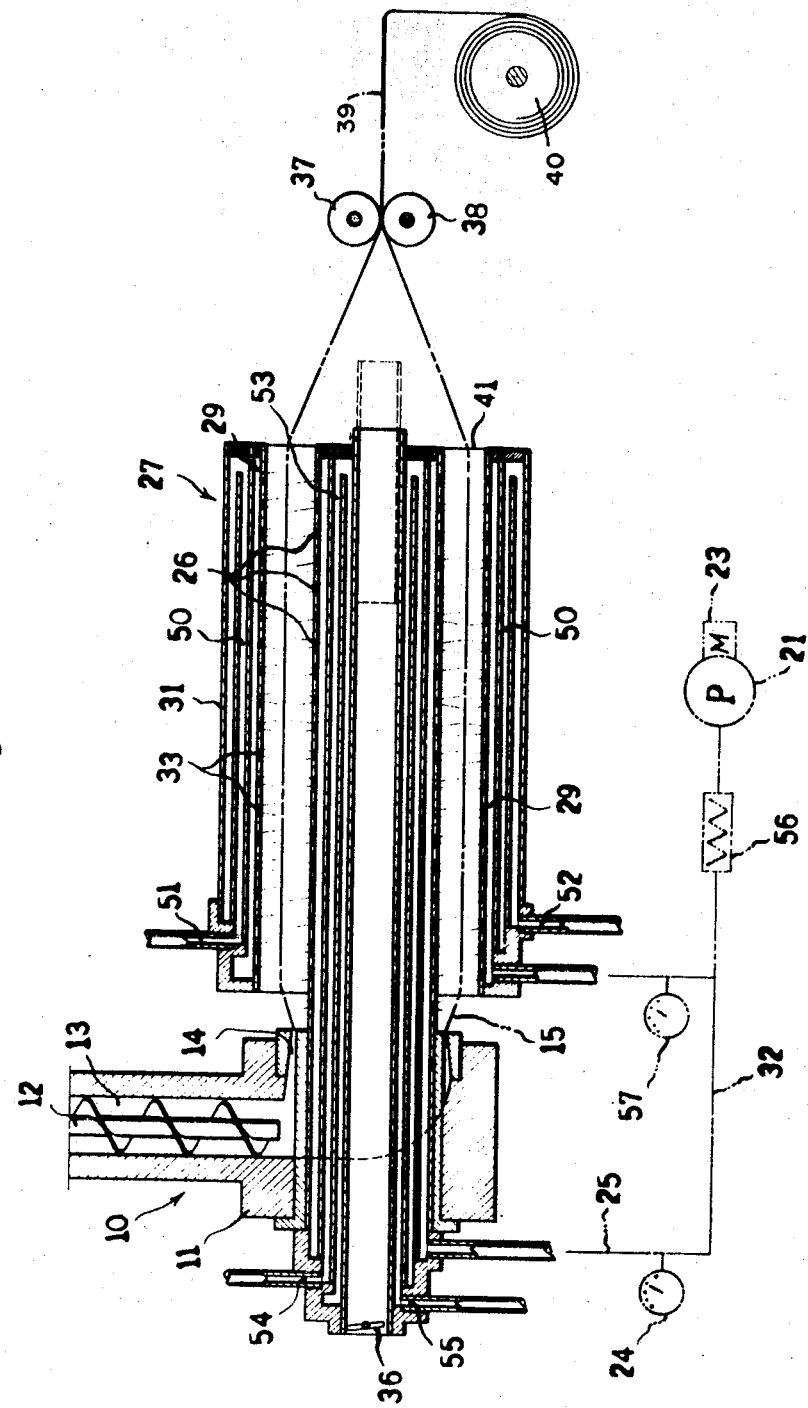

3,742,105

METHOD FOR PRODUCING A SEAMLESS TUBING

The present invention relates to a method for producing from thermoplastic material, particularly to the production of continuous seamless tubing from thermoplastic organic material, more specially to an improved system for cooling the extruded tubing being continuously extruded from the extruder in hot semi-molten condition.

One object of the present invention is to provide a new and improved method for producing the thin-walled seamless tubing continuously and rapidly.

Another object of the present invention is to provide an unique cooling system for the plastic material which is extruded from the die head of the extruder in hot semi-molten condition in the form of tubing.

In carrying out the invention in one aspect, a method for producing a seamless tubing is provided in which the process comprises the steps of extruding the thermoplastic material from extruder in the form of tubing in semi-molten condition, introducing the first compressed cooling medium into the tubing and radially spouting the fluid medium against the inner surface of the tubing wall for a certain distance thereby expanding the tubing into desired diameter and simultaneously cooling the tubing, and centripetally spouting the second compressed cooling fluid medium against the outer surface of the tubing wall simultaneously with the spout of the first fluid medium so as to sandwich the tubing wall by the both fluid medium for a certain distance, thereby cooling the tubing sufficiently and rapidly.

Preferably, the first and the second fluid mediums are continuous stream of air and being maintained at settled pressure and temperature.

Further the apparatus for performing this improved method has been built and being in successful operation.

The apparatus comprises an extruder for extruding the thermoplastic material in the form of tubing in semi-molten condition, means for introducing the first compressed cooling fluid medium into the tubing, means for radially spouting the fluid medium against the inner surface of the tubing wall for a certain distance to expand and cool the tubing, means for centripetally spouting the second compressed cooling fluid medium against the outer surface of the tubing wall simultaneously with the spout of the first fluid medium so as to sandwich the tubing wall by the both fluid mediums for a certain distance, and means for continuously winding up the expanded, cooled tubing.

Other objects and advantages of the subject invention will become apparent from reading the following detailed description and by reference to the accompanying drawings wherein:

FIG. 3 is a cross-sectional view of other embodiment of the apparatus; and

Referring now to the drawings wherein like numerals have been employed to designate similar parts throughout the various figures, it will be seen that one embodiment of the apparatus according to the present invention is illustrated by the numeral (A).

Figure 1:
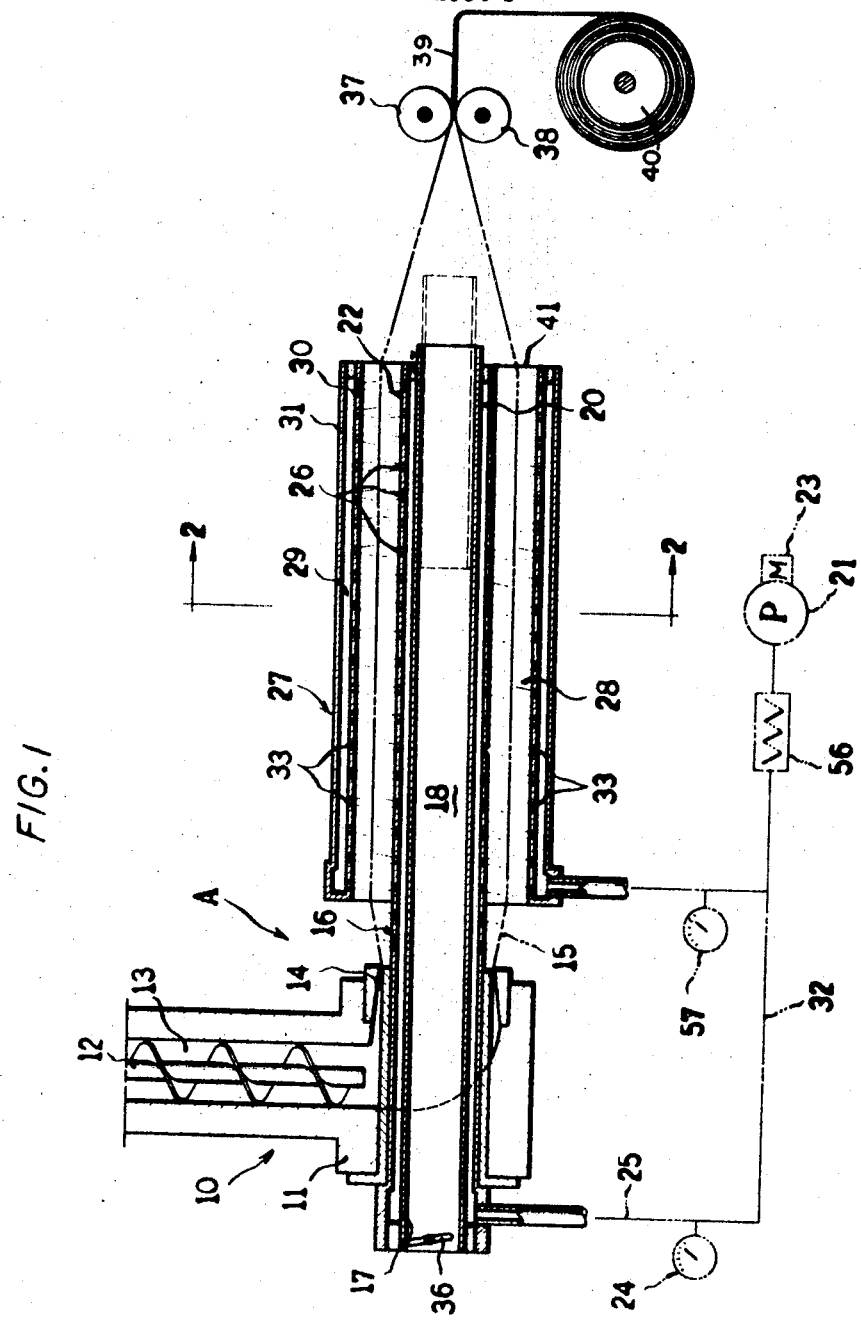
FIG. 1 is a cross-sectional view of the apparatus according to the present invention.

The apparatus includes an extruder 10 having a die head 11 and a feeding screw 12 which is rotated within a barrel 13 by any suitable drive means (not shown). The extruder 10 which may be jacketed for a temperature controlling medium in the usual way, extrudes the thermoplastic material, for example, as polyethylene, polypropylene, polystyrene or the like through the die head 11 out of a ring-like opening or orifice 14 through which the molten or semi-molten mass emerges in hot thermoplastic condition in the form of tubing 15. Said die head 11 is provided with a laterally elongated, double-wall tube or duct 16 which is movably supported by the die head and which is coaxially arranged with the orifice 14 within the latter, the greater part of the tube being forwardly projected out of the die head. said double-wall tube 16 comprises an inner wall 17 to define an inner passageway 18 therein, an outer wall 22 spaced apart from the inner wall to define a space or passageway 20 therebetween. The passageway 20 between the walls is connected to any source of compressed air, such as a variable speed pump 21 driven by a suitable motor 23. This pump is of the positive delivery type, such as a gear pump, and may be critically adjusted to deliver the desired quantity of air at the desired pressure. The pressure is indicated on a pressure gage 24 in a connecting line 25, leading from the pump 21 to a passageway 20. Outer wall 22 is provided a number of radial nozzles 26 at exposed portion thereof to spout the compressed, cooling air radially and outwardly.

Around the exposed portion of the double-wall tube 16, an outer double-walled cylinder 27 is arranged so as to leave a space or path 28 for passing the extruded tubing 15. Said outer cylinder also is provided with a passageway 29 between an inner and an outer walls 30 and 31 thereof, the passageway also being communicated with the source of the compressed air or speed pump 21 via a connecting line 32 which has a pressure gage 57 for indicating the pressure of air. Said inner wall 30 is provided with a number of nozzles 33 to spout compressed cooling air inwardly and radially. Preferably the compressed air to be spouted from the nozzles 26 and 33 is suitably cooled at a heat-exchanger 56.

The thermoplastic tubing 15 is extruded in semi-molten condition and passes in the path 28 at which the tubing is subjected to expansion due to the internal pressure of air spouted from the nozzles 26 and is simultaneously rapidly cooled by virtue of the internal air and the outer air which is spouted from the nozzles 33. The internal air within the tubing 15 flows into the inner passageway 18 through an end opening 34 and is drawn off via an outlet 35 having an adjustable baffle plate 36. By adjusting the baffle plate 36 and/or output of the variable speed pump 21, the internal pressure of air may be critically controlled to expand the tubing into the desired diameter and condition. Once the amount as to volume and pressure of air has been established, the baffle plate may remain set in a given position. Thus the expended tubing is sandwiched in between outer and inner compressed cooling air as long as the tubing is in the path 28 defined between the outer wall 22 of the tube 16 and the inner wall 30 of the outer cylinder, whereby the tubing may be cooled efficiently and rapidly.

The cooled tubing, now emerged from an exit 41 of the path 28, is pulled by means of rotating pull rolls 37 and 38 which collapse the tubing into a flattened sheet, these rolls also serving to eliminate any air in the flattened tubing. The flattened tubing designated 39 leaves the rolls in a flat ribbon-like form and is delivered to a wind roll 40 which may be driven in any desired way, so that the flattened tubing is continuously wound up by the wind roll 40. Prior to the winding stage, suitable treatment such as printing, sealing or the like may be added to the tubing if desired.

To facilitate the withdrawal of the tubing up to the exit 41 of the path 28 in the initial stage of the extrusion, the cylinder 27 is divided into two half parts, that is, an upper and a lower parts 42 and 43, these being separably hinged together at one of matting edges 42A and 43A thereof by means of a hinge 44. By reason of this construction, the upper part 42 may be widely opened relative to the lower part 43 around the hinge 44, whereby a leading end of the tubing being extruded from the orifice 14 at the initial stage of extrusion can be easily introduced up to the exit 41 of the path 28 by hands of operator, further this serves to facilitate the cleaning of interior of the cylinder 27 and the outer surface of the extended tube 16.

FIG. 3 shows an another embodiment of the present invention in which, for the purpose of cooling the compressed air within the passageways into desired temperature by fluid cooling medium, heat exchanging means are provided within the air passageways, respectively. For purposes of illustration, the fluid is hereinafter represented as being a liquid. In the embodiment, the cylinder 27 is provided with an exchanger duct 50 along the air passageway 29, for continuously passing the cooling liquid. This continuous cooling liquid is introduced from a suitable source (not shown) through an inlet 51 and is vented out from an outlet 52. Similar to the above construction, the tube 16 also is provided with an exchanger duct 53, along the air passageway 18, for continuously passing the cooling liquid, the latter being introduced from the source through an inlet 54 and being vented out from an outlet 55.

It will be apparent that many modifications and variations can be made to the embodiment of the invention described hereinbefore. For example, the orifice of the die head may be directed upward or downward, and the means for expanding and cooling the extruded tubing, that is, the assemble consisted of the double-walled tube 16 and the outer cylinder 27 may be vertically arranged.

Figure 2:
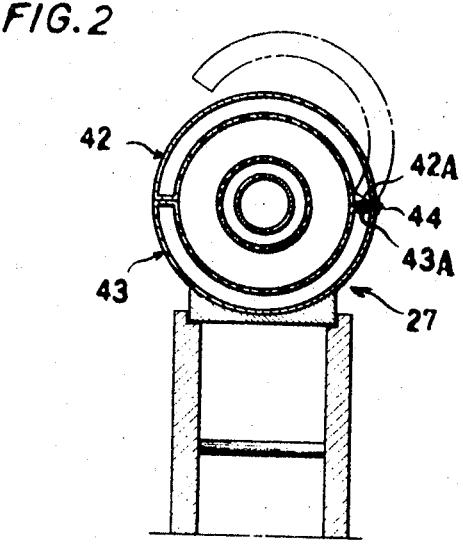
FIG. 2 is a vertical sectional view of the apparatus taken along the line 2—2 in FIG. 1.
Figure 4:
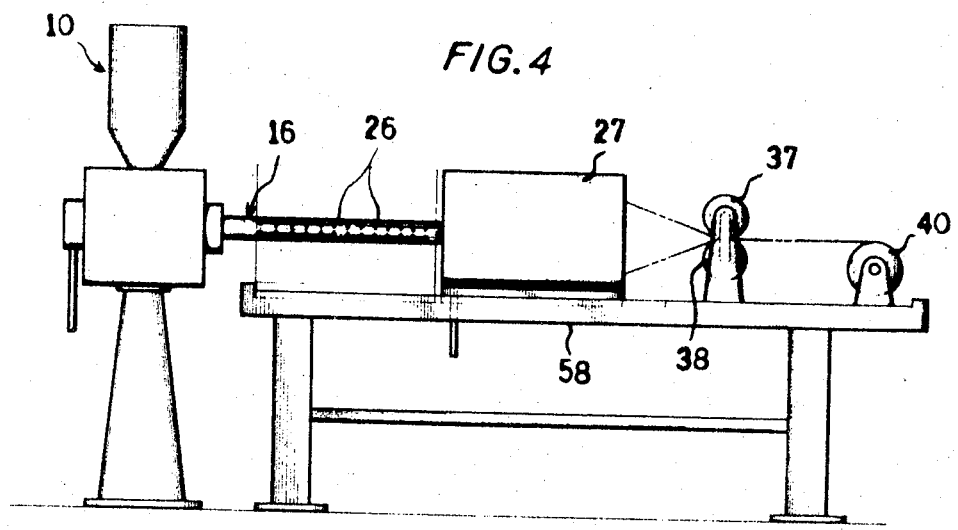
FIG. 4 is a side elevational view, on a reduced scale, of an another embodiment of the apparatus according to the present invention.

Furthermore the apparatus of the present invention may be modified as shown in FIG. 4 in which the outer cylinder 27 is mounted on the upper surface of a supporter 58 in such a manner that the outer cylinder 27 is capable of sliding along the axis thereof, so that the same effects to be caused from the construction illustrated in FIG. 2 may be obtained.

It will be appreciated that the method of the present invention also may be adapted for a double-wall tubing extruded from a dual orifice of the die head, instead of the single wall tubing.

The subject invention in its broader aspects is not limited only to the specific embodiments shown and described but departures may be made therefrom within the scope of the accompanying claims without departing from the principles of the invention and without sacrificing its chief advantages.

What I claim is:

1. A method of producing a seamless tubing comprising extruding a thermoplastic material from an extruder in the form of a semi-molten tubing, introducing a first compressed cooling fluid medium into the tubing and radially directing said first fluid medium outwardly onto the inner surface of the tubing for a predetermined distance thereby expanding the tubing to a desired diameter, the first fluid medium being directed successively from a plurality of longitudinally and radially spaced nozzles provided on an elongated inner cylindrical wall having a substantial length along the travelling direction of the tubing, centripetally directing a second compressed cooling fluid medium radially inwardly onto the outer surface of the tubing when the tubing reaches its desired diameter while continuing the directing of the first compressed cooling fluid medium, the second fluid medium being directed successively from a plurality of longitudinally and radially spaced nozzles provided on an elongated outer cylindrical wall having a substantial length along the travelling direction of the tubing, equalizing the pressure of the first fluid medium exerted onto the inner surface of the tubing with the pressure of the second fluid medium exerted onto the outer surface of the tubing to fix the inner and outer diameters of the tubing, pulling the tubing axially through the space defined by the inner and outer cylindrical walls through a pair of rotating pull rolls by a wind roll provided at the final end of the travelling direction of the tubing, collapsing the tubing into a flattened sheet by said pull rolls and winding the flattened tubing.

* * * * *